US009120232B1

United States Patent
Wong et al.

(10) Patent No.: US 9,120,232 B1
(45) Date of Patent: Sep. 1, 2015

(54) VACUUM PICK-UP END EFFECTOR WITH IMPROVED VACUUM READING FOR SMALL SURFACE

(71) Applicant: Western Digital Technologies, Inc., Irvine, CA (US)

(72) Inventors: Kelvin Wong, Petaling Jaya (MY); Komgrit Sungkhaphong, Klongsaamwa (TH)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/031,967

(22) Filed: Sep. 19, 2013

Related U.S. Application Data

(60) Provisional application No. 61/858,664, filed on Jul. 26, 2013.

(51) Int. Cl.
   *B25J 15/06*  (2006.01)

(52) U.S. Cl.
   CPC .......... *B25J 15/0616* (2013.01); *B25J 15/0666* (2013.01)

(58) Field of Classification Search
   CPC ............... B25J 15/0616; B25J 15/0625; B25J 15/0633; B25J 15/0641; B25J 15/0666; B66C 1/0218; B66C 1/0256
   USPC ............ 294/183, 185, 186, 188, 907; 901/40, 901/46
   See application file for complete search history.

(56) References Cited

U.S. PATENT DOCUMENTS

| | | | | |
|---|---|---|---|---|
| 3,853,345 A | * | 12/1974 | Miller | 294/186 |
| 4,553,892 A | * | 11/1985 | Huffman et al. | 414/797 |
| 4,557,514 A | | 12/1985 | Cushman et al. | |
| 4,650,233 A | * | 3/1987 | Mang et al. | 414/752.1 |
| 4,903,717 A | | 2/1990 | Sumnitsch | |
| 5,183,670 A | * | 2/1993 | Trudeau | 425/126.1 |
| 5,207,465 A | | 5/1993 | Rich | |
| 5,456,510 A | * | 10/1995 | Coots et al. | 294/183 |
| 5,470,420 A | | 11/1995 | Yokajty | |
| 5,772,170 A | * | 6/1998 | Tsukushi | 248/363 |
| 5,915,915 A | | 6/1999 | Allen et al. | |
| 6,049,973 A | | 4/2000 | Frank, Jr. et al. | |
| 6,065,789 A | * | 5/2000 | Nagai et al. | 294/185 |
| 6,102,459 A | * | 8/2000 | Pabst et al. | 294/185 |
| 6,139,078 A | | 10/2000 | Bodiker, II et al. | |

(Continued)

OTHER PUBLICATIONS

Notice of Allowance dated Oct. 10, 2013 in U.S. Appl. No. 13/331,960 11 pages.

(Continued)

*Primary Examiner* — Dean Kramer

(57) ABSTRACT

An end effector configured to pick up an item may comprise a vacuum port through which a vacuum is selectively drawn, a first vacuum pathway in communication with the vacuum port and defining a first open bore, a pin pathway and a pin disposed within the pin pathway and configured for constrained movement therein. The pin may be further configured to protrude from the end effector body, to contact the item and to move within the pin pathway until the item contacts the first open bore and is retained by the end effector by the force of the vacuum. Turning off the vacuum may cause residual vacuum in the first vacuum pathway to retain the item for a period of time and/or until the pin drops under its own weight within the pin pathway to contact and separate the item from the end effector.

20 Claims, 5 Drawing Sheets

(56) References Cited

U.S. PATENT DOCUMENTS

| | | | |
|---|---|---|---|
| 6,163,950 A | 12/2000 | Bodiker, II et al. | |
| 6,168,169 B1* | 1/2001 | Boyd et al. | 279/3 |
| 6,168,220 B1* | 1/2001 | Schmalz et al. | 294/186 |
| 6,336,266 B1 | 1/2002 | Kobayashi et al. | |
| 6,439,559 B1 | 8/2002 | Kinnard et al. | |
| 6,467,153 B2 | 10/2002 | Butts et al. | |
| 6,651,192 B1 | 11/2003 | Viglione et al. | |
| 6,657,801 B1 | 12/2003 | Chue et al. | |
| 6,663,092 B2 | 12/2003 | Kashiwazaki et al. | |
| 6,687,093 B1 | 2/2004 | Butler et al. | |
| 6,751,041 B1 | 6/2004 | Codilian et al. | |
| 6,788,480 B1 | 9/2004 | Codilian et al. | |
| 6,791,782 B1 | 9/2004 | Codilian et al. | |
| 6,792,669 B2 | 9/2004 | Codilian | |
| 6,798,592 B1 | 9/2004 | Codilian et al. | |
| 6,851,936 B2* | 2/2005 | Stingel et al. | 417/198 |
| 6,894,861 B1 | 5/2005 | Codilian et al. | |
| 6,897,393 B1 | 5/2005 | Codilian et al. | |
| 6,898,044 B1 | 5/2005 | Chheda | |
| 6,943,972 B1 | 9/2005 | Chue et al. | |
| 7,003,626 B1 | 2/2006 | Chheda et al. | |
| 7,027,242 B1 | 4/2006 | Terrill et al. | |
| 7,046,467 B1 | 5/2006 | Chheda | |
| 7,058,759 B1 | 6/2006 | Reiser et al. | |
| 7,072,129 B1 | 7/2006 | Cullen et al. | |
| 7,076,391 B1 | 7/2006 | Pakzad et al. | |
| 7,076,603 B1 | 7/2006 | Chheda | |
| 7,136,242 B1 | 11/2006 | Chue et al. | |
| 7,139,145 B1 | 11/2006 | Archibald et al. | |
| 7,145,744 B1 | 12/2006 | Clawson et al. | |
| 7,178,432 B1 | 2/2007 | Han et al. | |
| 7,199,959 B1 | 4/2007 | Bryant | |
| 7,203,020 B1 | 4/2007 | Viglione et al. | |
| 7,209,310 B1 | 4/2007 | Tsai et al. | |
| 7,222,410 B1 | 5/2007 | Klassen et al. | |
| 7,236,911 B1 | 6/2007 | Gough et al. | |
| 7,269,525 B1 | 9/2007 | Gough et al. | |
| 7,281,741 B2 | 10/2007 | Woodruff et al. | |
| 7,409,812 B2 | 8/2008 | Gilmore et al. | |
| 7,458,282 B1 | 12/2008 | Wuester, Sr. et al. | |
| 7,490,398 B1 | 2/2009 | Klassen et al. | |
| 7,506,553 B1 | 3/2009 | Panyavoravaj | |
| 7,549,204 B1 | 6/2009 | Vangal-Ramamurthy et al. | |
| 7,552,526 B1 | 6/2009 | Klassen et al. | |
| 7,559,590 B1 | 7/2009 | Jones | |
| 7,561,416 B1 | 7/2009 | Sarraf | |
| 7,596,722 B1 | 9/2009 | Pakzad et al. | |
| 7,634,375 B1 | 12/2009 | Pakzad et al. | |
| 7,653,983 B1 | 2/2010 | Klassen | |
| 7,669,711 B1 | 3/2010 | Westwood | |
| 7,671,599 B1 | 3/2010 | Tan et al. | |
| 7,673,638 B1 | 3/2010 | Boynton et al. | |
| 7,690,705 B1 | 4/2010 | Roberts et al. | |
| 7,743,486 B1 | 6/2010 | Klassen et al. | |
| 7,863,889 B1 | 1/2011 | Bamrungtham | |
| 7,869,182 B1 | 1/2011 | Tan et al. | |
| 7,869,183 B1 | 1/2011 | Tan et al. | |
| 7,874,424 B1 | 1/2011 | Westwood | |
| 7,896,218 B2 | 3/2011 | Rakpongsiri et al. | |
| 7,900,272 B1 | 3/2011 | Tan et al. | |
| 7,912,666 B1 | 3/2011 | Pakzad et al. | |
| 7,916,599 B1 | 3/2011 | Panyavoravaj et al. | |
| 7,921,543 B2 | 4/2011 | Trongjitwikrai et al. | |
| 7,940,487 B1 | 5/2011 | Krishnan et al. | |
| 7,974,038 B2 | 7/2011 | Krishnan et al. | |
| 7,980,159 B1 | 7/2011 | Han | |
| 7,987,585 B1 | 8/2011 | Klassen et al. | |
| 8,066,171 B1 | 11/2011 | Rakpongsiri et al. | |
| 8,078,421 B1 | 12/2011 | Shastry et al. | |
| 8,092,610 B1 | 1/2012 | Tarrant | |
| 8,094,414 B1 | 1/2012 | Cheng et al. | |
| 8,098,460 B1 | 1/2012 | Jen et al. | |
| 8,127,643 B1 | 3/2012 | Tan | |
| 8,135,208 B1 | 3/2012 | Vangal-Ramamurthy | |
| 8,162,366 B1 | 4/2012 | Tan et al. | |
| 8,168,033 B1 | 5/2012 | Mohamad Nor | |
| 8,180,487 B1 | 5/2012 | Vangal-Ramamurthy et al. | |
| 8,199,425 B1 | 6/2012 | Gustafson et al. | |
| 8,218,256 B1 | 7/2012 | Lin et al. | |
| 8,223,448 B1 | 7/2012 | Haw et al. | |
| 8,230,570 B1 | 7/2012 | Choong | |
| 8,245,601 B1 | 8/2012 | Hastama et al. | |
| 8,267,831 B1 | 9/2012 | Olsen et al. | |
| 8,270,118 B1 | 9/2012 | Cheng et al. | |
| 8,300,338 B1 | 10/2012 | McFadyen | |
| 8,307,537 B1 | 11/2012 | Klassen et al. | |
| 8,312,585 B1 | 11/2012 | Tarrant | |
| 8,322,235 B1 | 12/2012 | Keopuang et al. | |
| 8,327,529 B1 | 12/2012 | Tan et al. | |
| 8,335,049 B1 | 12/2012 | Liu et al. | |
| 8,345,367 B1 | 1/2013 | Tharumalingam | |
| 8,356,384 B1 | 1/2013 | Ferre et al. | |
| 8,369,073 B2 | 2/2013 | Trinh et al. | |
| 8,379,363 B1 | 2/2013 | Kolunthavelu et al. | |
| 8,387,631 B1 | 3/2013 | Thonghara et al. | |
| 8,424,418 B1 | 4/2013 | Wuester, Sr. et al. | |
| 8,424,824 B1 | 4/2013 | Tan et al. | |
| 8,432,630 B1 | 4/2013 | Lin et al. | |
| 8,432,631 B1 | 4/2013 | Lin et al. | |
| 8,447,430 B1 | 5/2013 | Tan et al. | |
| 8,447,551 B1 | 5/2013 | Ong et al. | |
| 8,451,578 B1 | 5/2013 | Tan et al. | |
| 8,453,841 B1 | 6/2013 | James et al. | |
| 8,454,755 B1 | 6/2013 | Tan et al. | |
| 8,485,772 B1 | 7/2013 | Ismail et al. | |
| 8,493,681 B1 | 7/2013 | Selvaraj | |
| 8,537,480 B1 | 9/2013 | Haw | |
| 8,544,164 B1 | 10/2013 | Cheng et al. | |
| 8,547,657 B1 | 10/2013 | Liu et al. | |
| 8,553,968 B1 | 10/2013 | Lee et al. | |
| 8,561,285 B1 | 10/2013 | Vangal-Ramamurthy et al. | |
| 8,565,511 B1 | 10/2013 | Sungkhaphong et al. | |
| 8,582,229 B1 | 11/2013 | Krishnan | |
| 8,596,107 B1 | 12/2013 | Wongdao et al. | |
| 8,605,383 B1 | 12/2013 | Wang et al. | |
| 8,640,328 B1 | 2/2014 | Yow et al. | |
| 8,650,716 B1 | 2/2014 | Methe et al. | |
| 8,653,824 B1 | 2/2014 | Liu et al. | |
| 8,662,554 B1 | 3/2014 | Srisupun et al. | |
| 8,683,676 B1 | 4/2014 | Wuester, Sr. et al. | |
| 8,689,433 B1 | 4/2014 | Choong | |
| 8,707,531 B1 | 4/2014 | Sungkhaphong et al. | |
| 8,713,333 B1 | 4/2014 | Selvaraj | |
| 8,763,790 B1 | 7/2014 | Neamsuwan et al. | |
| 8,789,446 B1 | 7/2014 | Sungkhaphong et al. | |
| 8,811,135 B1 | 8/2014 | Kasino et al. | |
| 2001/0040327 A1 | 11/2001 | Kashiwazaki et al. | |
| 2008/0084630 A1 | 4/2008 | Trongjitwikrai et al. | |
| 2009/157848 A1 | 6/2009 | Khoo | |
| 2010/0108256 A1 | 5/2010 | Roajanasiri et al. | |
| 2013/0057986 A1 | 3/2013 | Vangal-Ramamurthy et al. | |
| 2013/0248545 A1 | 9/2013 | Thongjitti et al. | |

OTHER PUBLICATIONS

Office Action dated Jan. 31, 2013 in U.S. Appl. No. 13/331,960 12 pages.

Notice of Allowance dated Jun. 21, 2013 in U.S. Appl. No. 13/331,960 8 pages.

* cited by examiner

VACUUM PICK-UP END EFFECTOR WITH IMPROVED VACUUM READING FOR SMALL SURFACE

CROSS-REFERENCE TO RELATED APPLICATIONS

This application claims priority to provisional U.S. Patent Application Ser. No. 61/858,664, filed on Jul. 26, 2013, which is hereby incorporated by reference in its entirety.

BACKGROUND

When picking up small and lightweight objects, vacuum is often used. Objects of small size, however, do not present very much surface against which the vacuum may act to lift or otherwise manipulate the object. Also of concern with smaller objects is detecting whether the object has been picked up or not.

DETAILED DESCRIPTION

Figure 1:
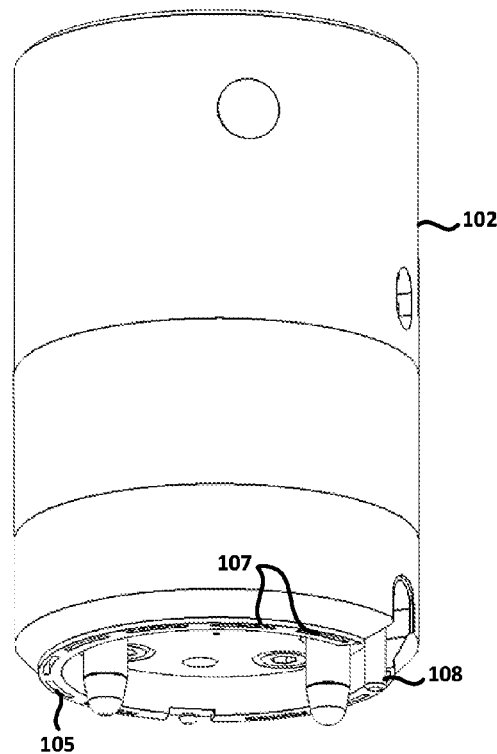
FIG. 1 shows an end effector comprising a plurality of open bores or slots through which vacuum may be drawn, according to one embodiment.

End effectors are commonly used to pick up items used in a manufacturing process. Such end effectors may utilize a mechanical grip and/or vacuum to pick up small items that may then be moved and incorporated into a larger device. When vacuum is the primary prehensile modality of the end effector, the size of the target surface on which the vacuum is to act constrains the size of the vacuum opening defined in the end effector, in that the vacuum opening should be smaller than the target surface to enable the part to be lifted by the vacuum. A smaller opening, however, tends to block the vacuum flow. A larger vacuum opening yields a larger vacuum flow and a lower negative pressure (herein, for example, a negative pressure of −5 kPa is lower than a negative pressure of −90 kPa). A smaller opening creates the opposite phenomenon.

In fact, it has been determined that the sensed difference between the negative pressures when the end effector has not yet picked up the part and the negative pressure sensed when the end effector has indeed picked up the part can be very small. This results in difficulties in determining whether, from the output of a vacuum pressure sensor, the end effector has indeed picked up the part or has failed to do so. Exemplary pressure values (in kPa) are shown below, in the case in which the end effector is configured to pick up a part such as, for illustrative purposes, a disk clamp of a hard disk drive.

TABLE 1

| No Disk Clamp | Disk Clamp Picked | Threshold delta |
|---|---|---|
| 24 | 40 | 16 |
| 25 | 38 | 13 |
| 24 | 39 | 15 |
| 26 | 38 | 12 |
| 25 | 38 | 13 |
| 25 | 40 | 15 |
| 24 | 41 | 17 |
| 26 | 39 | 13 |
| 24 | 40 | 16 |
| 23 | 38 | 15 |
| | Average Delta | 14.5 |

As shown in Table 1, the average threshold delta (i.e., the measured difference in pressure when no disk clamp has been picked up and when the disk clamp has been picked up) is only 14.5 kPa, which may not provide sufficient pressure margin to reliably make the determination of whether the item has, in fact, been picked up or not. Moreover, such values may vary due to changes in the supply of air to the end effector and across end effectors.

There are numerous factors that affect such vacuum readings. Examples of such may include, for example:

Surface roughness of the target surface of the item to be picked up;

Air leakage;

Supply air pressure drop (to vacuum generator); and

Fitting sizes

Embodiments enable reliably differentiating the vacuum pressures as between when the end effector has not yet picked up the item and when the end effector has indeed picked up the item. Such reliable differentiation, enabled by embodiments, results in a more efficient picking of the item and increases the yield of the underlying manufacturing process while decreasing costs.

According to one embodiment, an end effector may comprise a pin that is configured to protrude from an item facing surface of the end effector and to contact the item to be picked up. The pin may then move within a pin pathway defined within the end effector until the item contacts an open bore of a vacuum pathway through which vacuum is selectively drawn. The item may then be retained by the end effector against the item facing surface. When the vacuum is turned off, the item may then be retained against the item facing surface for a period of time through the force of residual vacuum in the first vacuum pathway or until the pin drops under the force of gravity to contact and separate the item from the item facing surface.

Figure 2:
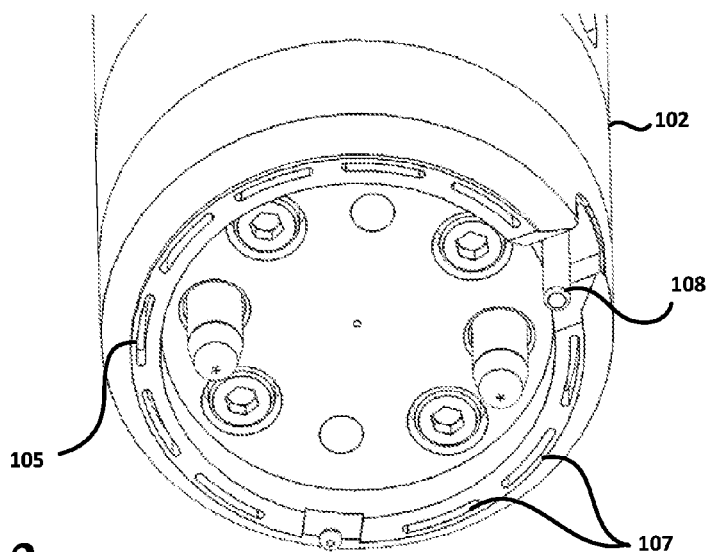
FIG. 2 shows a detail of the end effector of FIG. 1.
Figure 3:
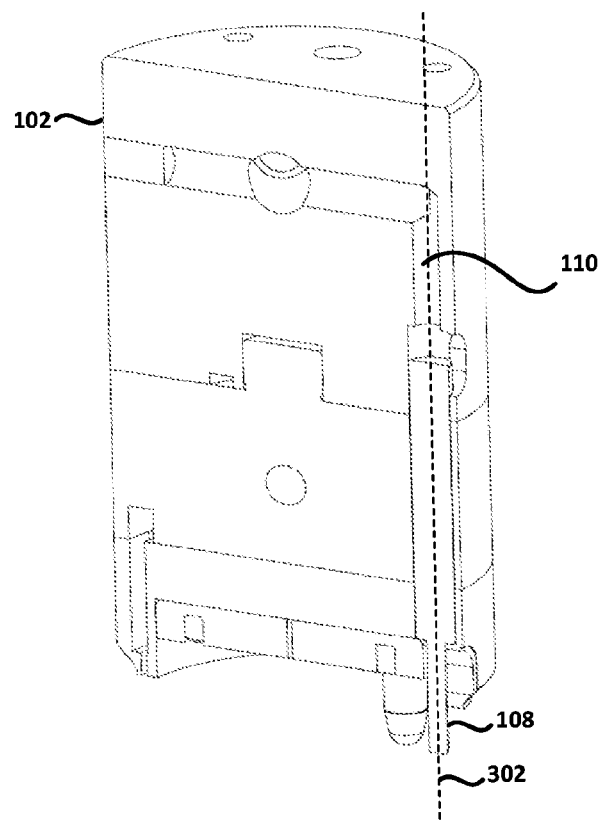
FIG. 3 show a cross sectional view of the end effector of FIG. 1, showing a pin within a pin pathway, according to one embodiment.
Figure 4:
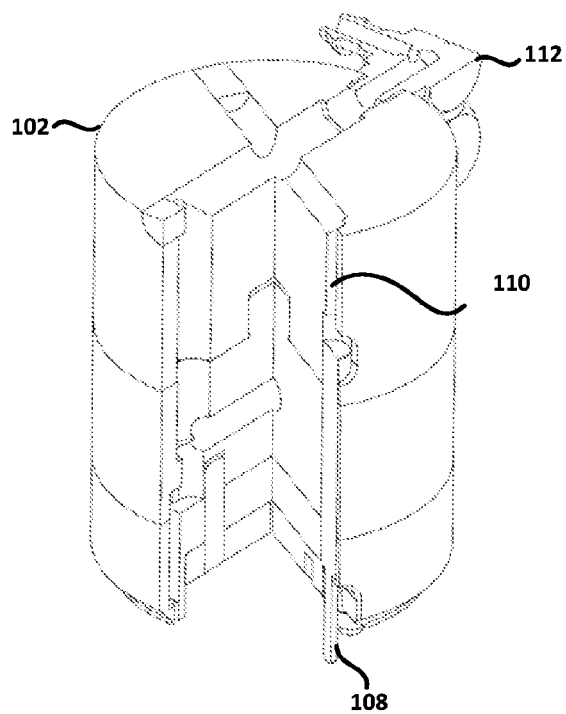
FIG. 4 is a cutaway view of the end effector of FIG. 1, showing the vacuum port in fluid communication with the pin pathway, according to one embodiment.

FIGS. 1-4 show various views of an end effector 102 according to one embodiment. FIG. 1 shows an end effector 102 according to one embodiment, comprising a first open bore 105 and the pin 108. As shown, the end effector 102 may also comprise one or more second open bores 107. The first open bore 105 may be coupled to a first vacuum pathway and the one or more second open bores 107 may be coupled to one or more corresponding second vacuum pathways. FIG. 2 is a detailed view of the end effector 102 of FIG. 1, showing the portion thereof that faces the item (not shown in FIGS. 1-4) to be picked up. FIG. 3 is a cross-sectional view of the end effector of FIGS. 1 and 2. FIG. 3 shows the pin 108 in cross section, disposed within pin pathway 110. The pin 108, according to one embodiment, may be configured for constrained movement within pin pathway 110 along an axis 302 in FIG. 3. FIG. 4 shows a cutaway view of the end effector 102 of FIG. 1 and shows a vacuum port 112 that is in communication with the pin pathway 110 and with the first vacuum pathway and (if present) the one or more second vacuum pathways.

Figure 5:
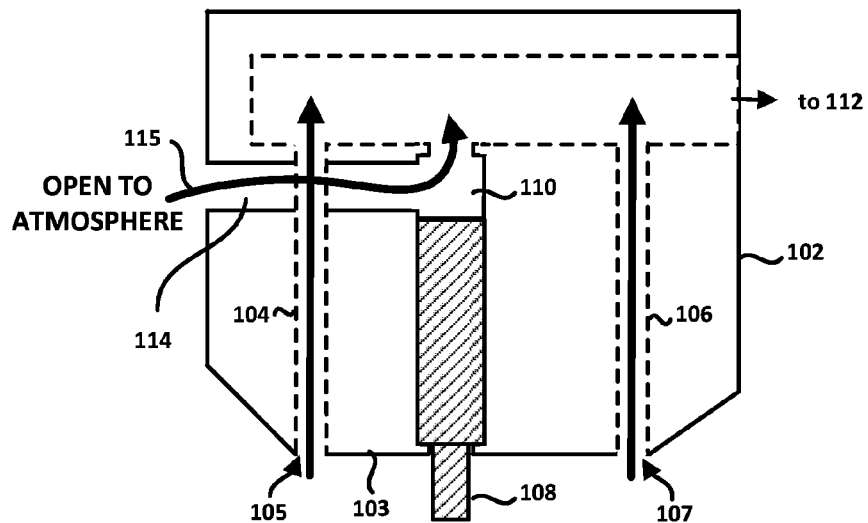
FIG. 5 is a diagram illustrating aspects of the end effector device and method for picking up an item, according to one embodiment.

FIGS. 5-8 are cross-sectional diagrams that illustrate the operation of an end effector according to one embodiment, as well as additional structural features thereof. As shown in FIG. 5, an end effector 102, which may be part of a greater assembly used in manufacture, may comprise a vacuum port (112 in FIG. 4) through which a vacuum may be selectively drawn, as indicated by the arrow captioned with "to 112" in FIGS. 5-8. As shown, the end effector 102 may comprise a first vacuum pathway 104 in communication with the vacuum port 112. The first vacuum pathway 104 may terminate in a first open bore or slot 105 at an item facing surface 103 of the end effector. Herein, the item facing surface 103 is that surface of the end effector 102 that, in operation, is closest to the item (shown at reference 602 in FIGS. 6-8) to be picked up. One or more second vacuum pathways 106 may be provided, also in communication with the vacuum port 112. The second vacuum pathway(s) 106 may terminate in one or more respective second open bores or slots 107, also at the item facing surface 103 of the end effector 102.

Figure 6:
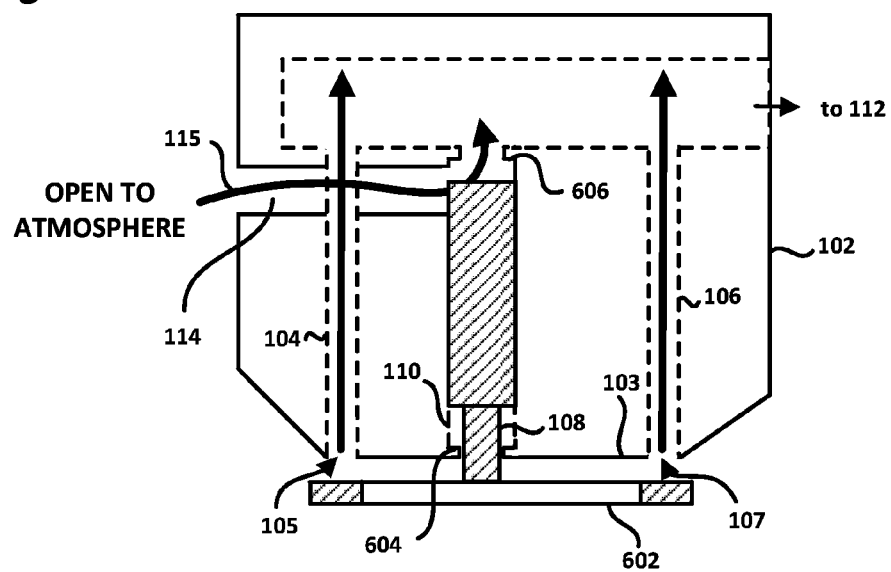
FIG. 6 is a diagram illustrating further aspects of the device and method for picking up an item, according to one embodiment.

The pin 108 is shown, in FIGS. 5-8, disposed within pin pathway 110. According to one embodiment, the pin 108 and the pin pathway 110 may be configured to enable the pin 108 to travel within the pin pathway 110, constrained by a first shoulder closest to the item facing surface 103 and a second should further away from the item facing surface 103. The first and second shoulders are best seen in FIG. 6, at reference numerals 604 and 606, respectively. The pin 108 may, therefore, be configured for constrained movement within the pin pathway 110. Indeed, the pin 108 may be constrained by the first shoulder 604 in its movement towards the item facing surface 103 and may be constrained by the second shoulder 606 in its movement away from the item facing surface 103.

As shown in FIG. 5, the pin 108 may be further configured to protrude from (i.e., break the plane of) the item facing surface 103. FIG. 5 shows the configuration of the end effector 102 in the state in which the end effector 102 has yet to retain or pick up an item and in which vacuum is being drawn from the vacuum port 112. That is, atmospheric or ambient air is being drawn into the first vacuum pathway 104 through the first open bore or slot 105, as indicated by the arrow within the first vacuum pathway 104. If one or more second vacuum pathways 106 are present, atmospheric or ambient air may be drawn into the second vacuum pathway or pathways 106 through corresponding second open bore(s) 107, as suggested by the arrow within the second vacuum pathway 106.

In operation, while the vacuum is being drawn from vacuum port 112, the end effector 102 may be moved towards the item 602 to the picked up. Alternatively, the item 602 may be moved towards the item facing surface 103 of the end effector 102. Alternatively still, the end effector 102 and the item 602 may be moved towards one another. Such movement of the end effector 102 and/or the item 602 may be carried out until the free end of the pin 108 closest to the item 602 contacts the target surface of the item 602. According to one embodiment, the target surface of the item 602 is that surface against which the end effector 102 acts to contact, retain and pick up the item 602. Once the pin 108 contacts the target surface of the item 602, continued movement of the end effector and/or the item 602 toward one another causes the pin 108 to travel within the pin pathway 110 away from the item 602. That is, the portion of the pin 108 that is configured to abut against the first shoulder 604 is lifted away from the first shoulder 604 as the pin retracts within the pin pathway 110. As the item 602 approaches the first open bore 105, the force of the vacuum drawn through the first vacuum pathway 104 begins to act upon the item 602, drawing the item 602 towards the item facing surface 103 of the end effector 102. Similarly, as the item 602 approaches the one or more second open bore 107, if such is or are present, the force of the vacuum drawn through the second vacuum pathway(s) 106 also begins to act upon the item 602, thereby also drawing the item 602 towards the item facing surface 103.

Figure 7:
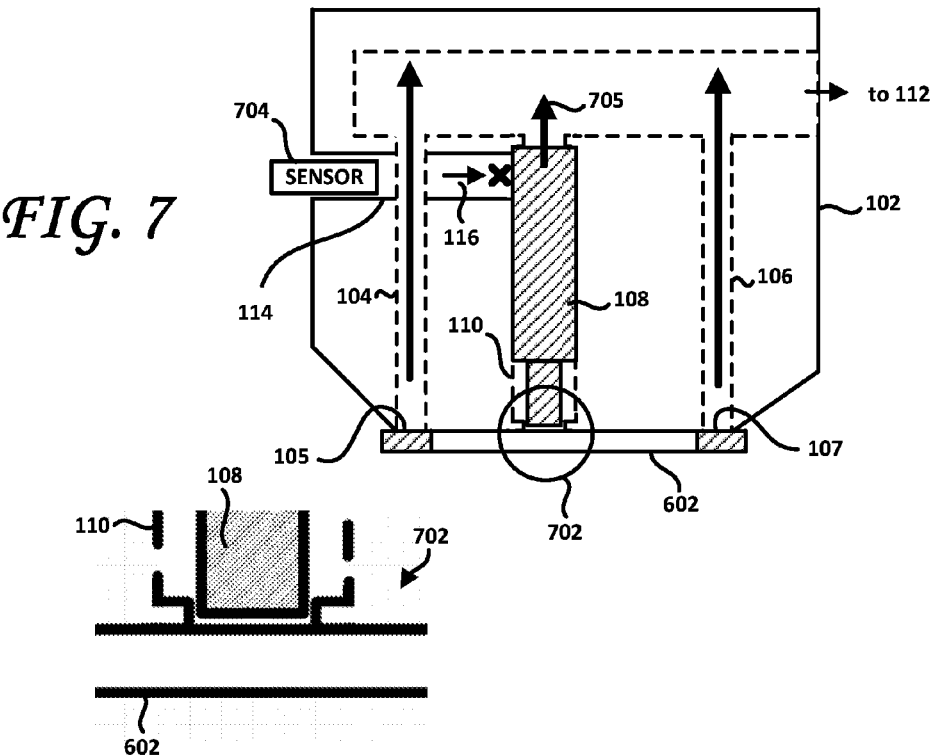
FIG. 7 is a diagram illustrating still further aspects of the device and method for picking up an item, according to one embodiment.

As shown in FIG. 7, once the item 602 has been drawn, by the force of the vacuum operating through the first open bore 105 and, if present, one or more open bores 107, the pin 108 makes contact with the item 602 as shown in FIG. 6 and pushes the pin 108 within the pin pathway 110 away from the item 602 until that portion thereof configured to abut the second shoulder 606 does, in fact, abut the second shoulder 606. In this configuration, according to one embodiment, the free end of the pin 108 that is closest to the item 602 may be disposed away from the target surface of the item 602. That is, the free end of the pin 108, in this state of operation (item retained by the end effector 102) does not touch the item 602, as shown in the detail view labeled 702 in FIG. 6. The pin 108, which is otherwise free to travel within the pin pathway 110, may be retained in its position abutting the second shoulder 606 within the pin pathway 110 by the force of the vacuum drawn through vacuum port 112, as suggested by arrow 705 in FIG. 7.

In the state in which, as shown in FIG. 7, the item 602 is retained by the end effector 102 against the item facing surface 103, the end effector 102 may move the retained item 602 anywhere the item 602 should be moved to further the underlying manufacturing process. Alternatively, the end effector may retain the item 602 while the workpiece being manufactured is moved to its next intended position in the manufacturing process. Alternatively still, both the workpiece being manufactured and the end effector 102 retaining the item 602 may move, as the manufacturing demands require.

Figure 8:
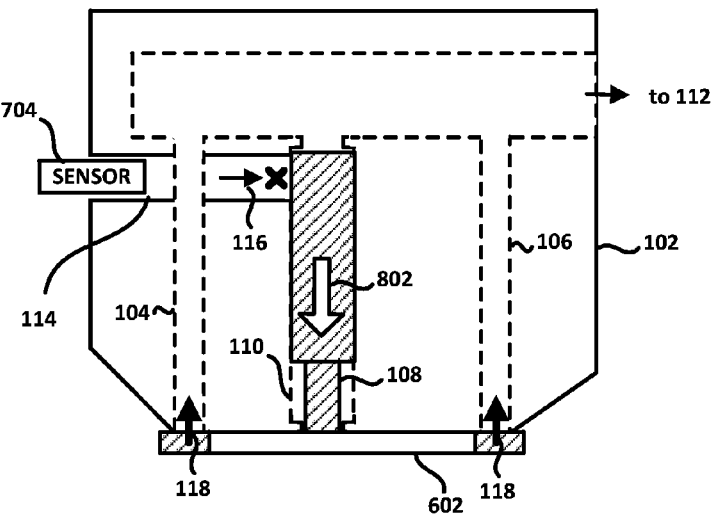
FIG. 8 is a diagram illustrating yet further aspects of the device and method for picking up an item, according to one embodiment.

As shown in FIG. 8, when it is desired to release the item 602 from being retained by the end effector 102, the vacuum may be turned off. As shown at 118, a comparatively lower pressure may still exist within the first vacuum pathway 104 and may also exist, if present, in the second vacuum pathways 106. Such comparatively (as compared to atmospheric pressure) lower pressure may be called a residual vacuum. Such residual vacuum 118, while not capable of exerting as much force as was exerted against the item 602 when the vacuum was being drawn through vacuum port 112, nevertheless may still be of sufficient magnitude to retain the item 602 against the item facing surface 103 of the end effector 102, at least for a limited period of time. As the pressures equalize, such residual vacuum may tend to ebb away.

Simultaneously, turning off the vacuum may cause the force 705 to decrease sufficiently such that the force of gravity is comparatively larger, causing the pin 108 to fall, as indicated by arrow 802, towards the item 602 within the pin pathway. The dead weight of the pin 108 contacting the item 602, combined with the ebbing force exerted on the item 602 by the residual vacuum 118, causes the item 602 to separate from the end effector 102. The item 602 is now released by the end effector 102.

According to one embodiment, the end effector comprises an atmospheric pathway 114. The atmospheric pathway 114 may be configured, as shown in FIGS. 6-8, to be open to the atmosphere. That is, according to one embodiment, the atmospheric pathway 114 is open to ambient air, as suggested by arrow 115. The atmospheric pathway 114, according to one embodiment, may also be in communication with the pin pathway 110, as shown. In the state depicted in FIG. 6, the vacuum is turned on, and ambient air is being drawn in the atmospheric pathway 114 through vacuum port 112. This reduces the force the vacuum is able to exert against the item 602. As the end effector 102 and the item 602 become closer to one another and as the item 602 pushes the pin 108 toward the second shoulder 606, the pin pathway 110, previously open to the ambient air through atmospheric pathway 114, begins to be closed off. Indeed, as the pin travels towards the second shoulder 606, it begins to block off the atmospheric pathway 114, as shown in FIG. 6. This, in turn, increases the force that the vacuum is able to exert on the item through the first open bore 105 and, if present the one or more second open bores 107.

In the state depicted in FIG. 7, the pin 108 has entirely closed off the atmospheric pathway 114 from the pin pathway 110, and ambient air is prevented from being drawn therein, as suggested at 116. This, in turn, increases the force of the vacuum against the item 602, as there is no longer an appreciable vacuum leak from the atmospheric pathway 114 leaking pressure-decreasing ambient air into the pin pathway 110 or the first vacuum pathway 104 and, if present, the one or more second vacuum pathways 106. In this state, the pin 108 is retained abutting against the second shoulder 606 within the pin pathway 110 by the force of the vacuum acting upon the surface of the pin 108 that is furthest from the item 602.

Conversely, when the vacuum is shut off; that is, when a vacuum is no longer being drawn through vacuum port 112 or a substantially lesser vacuum is being drawn therethrough, the force 705 acting upon the pin 108 also ebbs away or substantially decreases. It is to be noted that herein, "turning the vacuum off" and equivalent expressions include, within their scope, turning down the vacuum such that a comparatively lesser vacuum is drawn. At some point, that force 705 becomes less than the force of gravity tugging on the pin 108, causing the pin 108 to drop towards the item 602 under its own weight. This opens a path for ambient air to enter, through the atmospheric pathway 114, into the pin pathway 110 and into the first vacuum pathway 104 and, if present, the one or more second vacuum pathway(s) 106. The remaining residual vacuum 118 may hold the item 602 against the item facing surface 103 of the end effector for a while and/or until the force of the pin 108 contacting and weighing against the item 602 causes the item 602 to break the weakening vacuum seal (if any at this point) and to be released from the end effector 102.

According to one embodiment, the closing off of the atmospheric pathway 114 may be interpreted as a reliable indicator that the item 602 has been retained (e.g., picked up) by the end effector 102. Indeed, a sensor 704 may be provided and coupled to the atmospheric pathway 114. Such sensor 704 may be configured to generate a first or second output depending whether the pin 108 moves to close off the atmospheric pathway 114 as suggested at 116 from the vacuum port 112 (FIGS. 7-8) or does not close off the atmospheric pathway 114 from the vacuum port 112 (FIGS. 5-6).

Figure 9:
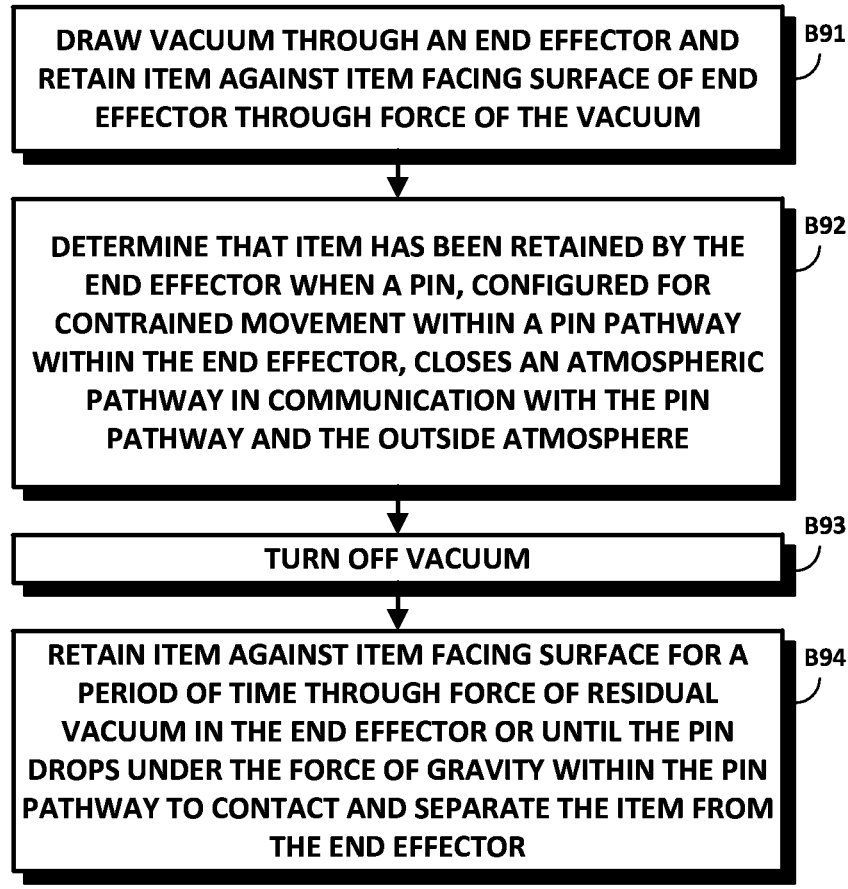
FIG. 9 is a flowchart of a method of picking up an item, according to one embodiment.

FIG. 9 is a flowchart of a method of picking up an item, according to one embodiment. As shown therein, Block B91 calls for a vacuum to be drawn through an end effector and to be retained against an item facing surface thereof, through the force of the vacuum. Thereafter, as shown at Block B92, it may be determined that the item has been retained by the end effector when a pin, configured for constrained movement within a pin pathway within the end effector, closes an atmospheric pathway that is in communication with the pin pathway and the outside (e.g., ambient) atmosphere. The vacuum may then be turned off, as called for at B93. Lastly, B94 calls for the item to be retained against the facing surface of the end effector for a period of item through the force exerted by residual vacuum in the end effector and/or until the pin drops under the force of gravity within the pin pathway to contact and separate the item from the end effector.

With reference again to Table 1 and according to one implementation, the average delta thresholds are shown in Table 2 as compared to the average delta thresholds shown in FIG. 1. Table 2 refers to the case in which the end effector, according to one embodiment, is configured to pick up an item such as, for illustrative purposes, a disk clamp of a hard disk drive. As detailed in Table 2, the average threshold vacuum delta reading is 26.9 kPa, compared to 14.5 kPa from Table 1. This corresponds to a delta value increase of +85.5% relative to the delta of Table 1.

TABLE 2

| No Disk Clamp | Disk Clamp Lifted | Threshold delta |
| --- | --- | --- |
| 12 | 38 | 26 |
| 10 | 37 | 27 |
| 13 | 39 | 26 |
| 13 | 40 | 27 |
| 12 | 38 | 26 |
| 12 | 40 | 28 |
| 13 | 40 | 27 |
| 12 | 39 | 27 |
| 11 | 40 | 29 |
| 12 | 38 | 26 |
| | Average Delta | 26.9 |

In turn, this large differential between the sensed negative pressure as between when the end effector 102 has not picked up the disk clamp (standing in for item 602 in this example) item and when it has, enables the accurate and repeatable detection of whether the clamp has been picked up or not. This accurate detection, in turn, may operate to prevent or decrease the loss of yield otherwise experienced when conventional end effectors are used in the manufacturing process.

Accordingly, the incidence of false failure from "fail to pick up" (e.g. the item has been physically picked up, but machine comprising the end effector does not know and shows failure) is markedly decreased. Advantageously, although one is shown at 704 in FIGS. 7 and 8, the end effector 102 according to embodiments does not require additional sensors, which would otherwise lead to additional costs. For example, the sensor 704 may comprise a vacuum pressure sensor. However, as an alternative to such vacuum pressure sensors, one or more fiber optic sensors (e.g., of the reflective type) may be added to the end effector 102, to detect when the item 602 has been picked up (e.g., retained by the end effector 102 against the item facing surface 103 thereof). It is to be noted, however, that embodiments do not require vacuum pressure sensors or fiber optic sensors, which simplifies the design and decreasing the cost thereof.

While certain embodiments of the disclosure have been described, these embodiments have been presented by way of example only, and are not intended to limit the scope of the disclosure. Indeed, the novel methods, devices and systems described herein may be embodied in a variety of other forms. Furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure. For example, those skilled in the art will appreciate that in various embodiments, the actual physical and logical structures may differ from those shown in the figures. Depending on the embodiment, certain steps described in the example above may be removed, others may be added. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A device for picking up an item, comprising:
   an end effector comprising:
      a vacuum port through which a vacuum is selectively drawn;
      a first vacuum pathway in communication with the vacuum port and defining a first open bore at an item facing surface of the device that is closest to the item to be picked up;
      a pin pathway in communication with the vacuum port, the pin pathway being separate and disposed away from the first vacuum pathway;
      an atmospheric pathway in communication with the pin pathway and with the outside atmosphere; and
      a pin disposed within the pin pathway and configured for constrained movement only within the pin pathway and not within the vacuum pathway;
      wherein the pin is further configured to protrude from the item facing surface of the device, to contact the item to be picked up and to move within the pin pathway until the item contacts the first open bore of the first vacuum pathway through which the vacuum is selectively drawn and is retained by the end effector against the item facing surface.

2. The device of claim 1, wherein the first vacuum pathway is configured such that, when the vacuum is turned off, residual vacuum in the first vacuum pathway retains the item for a period of time or until the pin drops under a force of gravity to contact and separate the item from the item facing surface of the end effector.

3. The device of claim 2, wherein the pin is further configured to drop under the force of gravity within the pin pathway when the vacuum is turned off.

4. The device of claim 1, further comprising a second vacuum pathway defining a second open bore at the item facing surface and wherein vacuum is also selectively drawn through the second vacuum pathway.

5. The device of claim 1, wherein the end effector is configured to move the retained item from a first location to a second location.

6. The device of claim 1, further comprising a vacuum sensor coupled to the atmospheric pathway, the sensor being configured to generate a first or second output depending on whether the pin moves to close off the atmospheric pathway from the vacuum port or does not close off the atmospheric pathway from the vacuum port.

7. The device of claim 1, wherein the pin is further configured to move within the pin pathway such that the pin is not in contact with the item when the vacuum is drawn and when the item is retained against the item facing surface.

8. The device of claim 1, wherein the pin is pulled away from the item by the vacuum when the item is retained against the item facing surface.

9. The device of claim 1, wherein the pin is configured to contact the item by at least one of moving the end effector toward the item and moving the item closer to the end effector.

10. A method of picking up an item, comprising:
    drawing a vacuum through a first vacuum pathway defined within an end effector and retaining the item against an item facing surface of the end effector by force of the vacuum;
    determining that the item has been retained by the end effector when a pin, configured for constrained movement only within a pin pathway within the end effector that is separate and disposed away from the first vacuum pathway and not within the first vacuum pathway, closes an atmospheric pathway in communication with the pin pathway and with the outside atmosphere;
    turning off the vacuum; and
    retaining the item against the item facing surface for a period of time through force of a residual vacuum in the end effector or until the in drops under the force of gravity within the pin pathway to contact and separate the item from the end effector.

11. The method of claim 10, further comprising moving the retained item from a first location to a second location.

12. The method of claim 11, wherein turning off the vacuum causes the pin to drop within the pin pathway.

13. The method of claim 10, wherein determining comprises reading an output of a sensor coupled to the atmospheric pathway, the sensor being configured to generate a first or second output depending whether the pin moves to close off the atmospheric pathway from the vacuum or does not close off the atmospheric pathway from the vacuum.

14. The method of claim 10, wherein retaining the item comprises moving the pin such that the pin is not in contact with the item when the vacuum is drawn and the item is retained against the item facing surface.

15. The method of claim 14, wherein moving the pin comprises moving the pin away from the item.

16. A method of picking UP an item, comprising:
    drawing a vacuum through a first vacuum pathway defined within an end effector and retaining the item against an item facing surface of the end effector by force of the vacuum;
    determining that the item has been retained by the end effector when a pin, configured for constrained movement only within a in pathway within the end effector that is separate and disposed away from the first vacuum pathway and not within the first vacuum pathway, closes an atmospheric pathway in communication with the in pathway and with the outside atmosphere;
    moving at least one of the end effector and the item closer to one another while the vacuum is drawn through the end effector; and
    causing the pin to protrude from the item facing surface until the pin is pushed by the item and pulled by the vacuum within the pin pathway.

17. A method of picking up an item, comprising:
    providing an end effector comprising: a first vacuum pathway in communication with a vacuum port through which a vacuum is selectively drawn, the first vacuum pathway terminating in a first open bore at an item facing surface of the end effector that is closest to the item to be picked up; a pin pathway that is separate and disposed away from the first vacuum pathway, and a pin disposed and configured for constrained movement only within the pin pathway and not within the first vacuum pathway;

drawing a vacuum through the vacuum port and the first vacuum pathway;

moving at least one of the end effector and the item until the pin, initially protruding from a surface of the end effector facing the item to be picked up, contacts the item to be picked up; and retaining the item against the item facing surface of the end effector as the item comes in contact with the first open bore of the first vacuum pathway and with the item facing surface of the end effector.

18. The method of claim 17, further comprising:

turning off the vacuum, thereby causing residual vacuum in the first vacuum pathway to retain the item against the item facing surface for a period of time or until the pin drops under a force of gravity to contact and separate the item from the end effector.

19. The method of claim 17, wherein the pin pathway is in communication with the vacuum port and wherein the end effector further comprises an atmospheric pathway in communication with the pin pathway and with the outside atmosphere, and wherein the method further comprises coupling a vacuum sensor to an atmospheric pathway, the sensor being configured to generate a first or second output depending on whether the pin moves to close off the atmospheric pathway from the vacuum port or does not close off the atmospheric pathway from the vacuum port.

20. The method of claim 17, wherein the end effector further comprises a second vacuum pathway defining a second open bore at the item facing surface and wherein drawing further comprises drawing the vacuum through the second vacuum pathway.

* * * * *